United States Patent [19]

MacNeal et al.

[11] Patent Number: 4,959,101

[45] Date of Patent: Sep. 25, 1990

[54] PROCESS FOR DEGASSING ALUMINUM MELTS WITH SULFUR HEXAFLUORIDE

[75] Inventors: James R. MacNeal, Painesville; Timothy P. Rack, Solon; Ronald R. Corns, Maumee, all of Ohio

[73] Assignee: AGA AB, Cleveland, Ohio

[21] Appl. No.: 251,959

[22] Filed: Sep. 28, 1988

Related U.S. Application Data

[63] Continuation of Ser. No. 67,949, Jun. 29, 1987, abandoned.

[51] Int. Cl.$^5$ ............................................. C22B 21/06
[52] U.S. Cl. .................................... 75/685; 420/532; 420/533; 420/541; 420/542
[58] Field of Search ............... 75/63, 68 R; 420/532, 420/533, 541, 542

[56] References Cited

U.S. PATENT DOCUMENTS

| | | | |
|---|---|---|---|
| 3,528,801 | 9/1970 | Bylund et al. | 75/68 R |
| 3,854,934 | 12/1974 | Dore et al. | 75/68 R |
| 3,870,511 | 3/1975 | Szekely | 75/68 R |
| 3,958,980 | 5/1976 | Szekely | 75/68 R |
| 3,958,981 | 5/1976 | Forberg et al. | 75/93 E |
| 3,972,709 | 8/1976 | Chia et al. | 75/93 R |
| 4,003,738 | 1/1977 | Valdo | 75/68 R |
| 4,010,030 | 3/1977 | French | 75/93 E |
| 4,052,199 | 10/1977 | Mangalick | 75/68 R |
| 4,099,965 | 7/1978 | Beguin et al. | 75/68 R |
| 4,235,627 | 11/1980 | Dantzig et al. | 75/93 E |
| 4,350,524 | 9/1982 | Knoepke et al. | 75/93 E |
| 4,354,869 | 10/1982 | Hummer et al. | 75/63 |
| 4,402,741 | 9/1983 | Pollet et al. | 75/93 E |
| 4,417,923 | 11/1983 | Beranek et al. | 75/257 |
| 4,507,150 | 3/1985 | Dube | 75/63 |
| 4,556,419 | 12/1985 | Otsuka et al. | 75/68 R |

FOREIGN PATENT DOCUMENTS

| | | | |
|---|---|---|---|
| 354114 | 12/1979 | Austria | 75/68 R |
| 181227 | 5/1986 | European Pat. Off. | 75/68 R |

*Primary Examiner*—Melvyn J. Andrews
*Attorney, Agent, or Firm*—Calfee, Halter & Griswold

[57] ABSTRACT

Aluminum and aluminum alloy melts are purified by removing entrained gaseous impurities and solid particulate impurities, primarily aluminum oxides, by bubbling a non-corrosive intimate mixture of sulfur hexafluoride in an inert gas. Magnesium levels, if present, are not significantly reduced. The process is reliable and the gas mixture safe for aluminum purifying operations and procedures.

11 Claims, No Drawings

PROCESS FOR DEGASSING ALUMINUM MELTS WITH SULFUR HEXAFLUORIDE

This application is a continuation of application Ser. No. 067,949, filed June 29, 1987, now abandoned.

BACKGROUND OF THE INVENTION

1. Field of the Invention

The present invention relates to the refining of aluminum and, more specifically to a system for degassing molten aluminum without significantly reducing magnesium levels, if present.

2. Prior Art

Molten aluminum typically is contaminated with hydrogen and unwanted elements such as sodium, calcium, and lithium. If magnesium is present in the melt to an excessive extent, the excessive magnesium likewise can be regarded as a contaminant; however in working with many aluminum melts, the level of magnesium that is present is not excessive, and it is desirable to effect removal of hydrogen and other unwanted elements without significantly altering the level of magnesium that is present in the melt.

A problem with prior processes for removing hydrogen and the other contaminants mentioned above is that the magnesium content of the melt often is altered undesirably as the processes are preformed.

Prior proposals to remove the aforementioned contaminants have included the use of gases bubbled up through the melt to chemically react with the impurities or to physically remove the impurities. Suitable gases include inert gases, such as argon and nitrogen, reactive gases such as chlorine (from chlorine-containing salts, chlorine gas generating tablets, typically hexachloroethane, chlorine gas and halocarbon gases), and fluorine, as well as mixtures of inert gases (nitrogen and argon) or mixtures of reactive gases (chlorine and fluorine).

The patent literature contains proposals for removing specific contaminants. Small quantities of alkali metal and alkaline earth metal impurities are removed from an aluminum melt by introducing a source of sulfur, such as elemental sulfur, according to a process that is described in U.S. Pat. No. 4,354,869. An impurity-containing slag is formed and is removed form the melt. Lithium is removed from molten aluminum alloys by introducing sulfur hexafluoride as a gas or with a carrier gas such as nitrogen or argon according to Austrian Pat. No. 354,114. The fluorine in the $SF_6$ reacts with the lithium to form a LiF precipitate, while the sulfur reacts with the lithium to form $Li_2S$. The lithium content of the alloy is reduced to the parts per million level. Gaseous and solid impurities such as occluded hydrogen and metal oxides are removed from molten aluminum using a fully fluorinated or chlorinated lower hydrocarbon mixed with a relatively inactive or inert gas, as is described in U.S. Pat. No. 3,854,934. A liquified salt cover, lower in density than the molten aluminum, floats on the metal surface to inhibit discharge of potentially harmful gases.

Three physical mechanisms are active in the removal of these elements. When a gas of the type described is introduced into the melt, hydrogen that is present in the melt diffuses into the rising gas bubbles, and slag particles adhere to the surface of the gas bubbles—which causes the slag particles to be flushed up to the surface of the bath. In addition, the elements to be removed may react with one or more of the reactive components of the gas introduced into the melt.

Hydrogen is removed from the melt by diffusion into the rising gas bubbles. This occurs as a result of the difference in partial pressure between the melt and the gas, the rate of diffusion is determined by the partial pressure difference between the gas and the melt, as well as by the surface area of contact between the gas and the melt. The contact time between the gas and the melt is also an important consideration.

A gas which bubbles through a melt must have as low a hydrogen or moisture content as possible. If the partial pressure of the hydrogen in the gas is assumed to be about zero, the difference in hydrogen partial pressure will be substantial at the beginning of the flushing. The large difference in pressure forces hydrogen from the melt into the gas bubble. This means that hydrogen easily diffuses into the gas bubbles and that large quantities of hydrogen are removed.

The partial pressure of hydrogen in the melt decreases with increased flushing time, and as the difference in partial pressure decreases, the removal of the hydrogen diminishes. This means the flow of the gas used for degassing should be increased at the end of the process to facilitate the removal of the final amounts of hydrogen. Thus while the hydrogen content in a melt containing a large amount of hydrogen can be quickly decreased, further reduction of the hydrogen content will require a long flushing time and relatively large quantities of gas.

The surface area of the gas bubbles into which the hydrogen diffuses determines the area of contact surface between the melt and the inert gas; thus a larger contact surface area will have a positive influence on the removal of the hydrogen. A larger contact surface area is obtained by increasing the amount of gas, or by decreasing the size of the bubbles. The amount of gas supplied to the melt may be increased by utilizing a longer flushing time, or by utilizing a greater volume of gas per time unit. A disadvantage of utilizing an increased flow of gas is that the gas flow through the melt causes a temperature drop, and the temperature drop that results with an increased flow likely will be greater than desired. Further, the increased flow of gas likely will create such violent movement in the bath that particles from the surface of the bath may be pulled down into the melt.

For reasons of economy, it is desirable to use as little gas as possible. Thus, it is preferable to reduce the size of the bubbles so that the surface area to volume relationship is improved.

Apart from the difference in the hydrogen partial pressure and the size of the bubbles, the diffusion of hydrogen into the gas bubble is also time dependent. This means that decreasing bubble size serves a double function. In addition to improving the surface area to volume relationship, smaller bubbles tend to rise more slowly in the melt, thus providing a longer contact time with the melt.

The average contact time that bubbles spend moving through a melt is also dependent on the geometry of the furnace. With a given melt volume, increased bath depth will have a positive influence on the flushing effect since the gas bubbles will then be in contact with the melt for a longer period of time.

The direction in which bubbles are injected into a melt also will have a marginal effect on contact time. If gas is injected in a downward direction, the bubbles will be forced down into the melt before they begin to rise to the surface, whereby contact time will be increased.

Oxides and nonmetallic inclusions adhere to the bubble surface and are flushed out of the melt via flotation. Particles in the size range of 1 micrometer to 1 millimeter that are suspended in the melt readily attach themselves to the surfaces of the upward rising bubbles and are given sufficient upward movement to be flushed to the surface of the bath. Flushing is influenced by the size of the bubbles, the route the bubbles take, and the surface tension of the bubble.

The degassing agent used can cause a wetting effect on the bubble surface which will increase the ability of the gas to remove oxides and particles. Bubble size and path are an expression of the likelihood that a particle will be encountered by a bubble; surface tension determines to what extent a particle will adhere to the bubble which it encounters.

The unwanted elements in aluminum melts normally concerned are sodium, calcium and lithium. Another element that is present in aluminum melts, but which often is desirably left in the melt, is magnesium. While the removal of these elements has been widely discussed, the mechanisms of their removal are not fully understood.

There are three basic methods in commercial use for removing impurities from aluminum melts. One method uses argon. A second uses nitrogen. A third uses chlorine.

Using the inert gases argon and nitrogen is effective to remove hydrogen, at least to a certain level, but is relatively ineffective in removing active species impurities such as sodium, calcium, lithium and excessive magnesium. A more detailed discussion of the relative advantages and disadvantages of the use of the inert gases, argon and nitrogen, and the reactive gas, chlorine, will conclude this discussion of the practices of the prior art.

Argon and nitrogen work fairly well for degassing, but they can only remove up to a certain absolute level of remaining hydrogen. A further problem with industrial grades of argon or nitrogen is that these gases can contain moisture and oxygen which can form hydrogen and aluminum oxides; an ultra high purity gas avoids this problem. Neither nitrogen or argon have much of an effect on oxides or particles present in the melt.

Argon is an inert gas, i.e., it does not react with the melt, thus hydrogen is removed by diffusion into the argon bubbles. Particles are removed by the purging mechanism. Argon has no effect on the elements apart from a possible mechanical agitation effect.

In principle, nitrogen acts in the same way as argon. It is, however, generally accepted that, under similar circumstances, the removal of hydrogen takes place somewhat quicker when using argon that nitrogen. Also, the absolute value of the hydrogen remaining in the melt will be slightly lower when using argon than when using nitrogen.

Nitrogen gives a wetter slag than argon and can be a problem in alloys containing more than 1% magnesium. This is because nitrogen is not completely inert, but reacts with the melt to form nitrides, particularly $Mg_3N_2$.

Chlorine added to the melt quickly reacts to $AlCl_3$ which is gaseous at temperatures above about 374 degrees Farenheit, so that, in reality, the melt is flushed by upward rising $AlCl_3$ bubbles. Chlorine is extremely effective for removing hydrogen, which is removed by diffusion, because the hydrogen partial pressure in $AlCl_3$ is virtually zero. However, chlorine gas is used in a stoichiometric excess and exits the melt as pure chlorine which presents safety and environmental concerns. In addition, chlorine reacts rather slowly with aluminum as compared with other metals.

$AlCl_3$ gas bubbling through the melt is reactive and continues to react with the melt. Salt particles formed collect like slag on the surface of the melt, but some remain suspended in the melt. It has been shown that these particles can be the cause of the creation of agglomerates (an aluminum droplet encrusted with a salt film to which small particles of magnesium oxide and aluminum nitride are adhered) with diameters of about 20 to 200 micrometers.

Chlorine reacts with the elements sodium, calcium, magnesium, lithium, etc., and with aluminum; but where magnesium removal is not desired, this presents a problem. Chlorine removes substantial quantities of magnesium and in consequence, the magnesium must often be replaced. Fluorine acts in a manner similar to chlorine.

Chlorine and fluorine are available in several forms, the most common of which are chlorine gas, salts, and halocarbons. Dry chlorine gas gives the same effects as described for chlorine. Hexachloroethane salt produces the same reaction as described for chlorine and/or fluorine, but the salt is very often hygroscopic. This means that salt can introduce moisture into the melt depending on how the salt has been stored, the relative humidity at the time of storage and/or use, and the type of salt.

The effect of a halogen releasing salt on the hydrogen content of the melt depends upon the reactions which create gas bubbles. The creation of bubbles is uncontrolled after the addition of the salt—bubbling begins violently and then tapers off as the salt is consumed, which is inconsistent with the need for greater quantities of gas at the end of the degassing process in order to remove the last ppm of hydrogen. Halocarbons are normally introduced into the melt in the form of a gas which also have the same reactions as described above for chlorine and fluorine. In addition to the usual reactions as with chlorine and fluorine, reactions with the carbon component of the halocarbon gas also take place.

Sulfur hexafluoride ($SF_6$) can also be added as a gas to the melt. As with chlorine and fluorine, sulfur hexafluoride can successfully cope with diffusion and flushing; however, reaction is minimal. Sulfur hexafluoride uses the flushing action more efficiently to rival the quality obtained by the reaction of chlorine and fluorine.

Safety of these gases and gas-producing materials is a concern. Although nitrogen and argon are nontoxic, chlorine (and fluorine) gas is corrosive and poisonous and strict limits are placed on worker exposure to chlorine as well as transport and storage of the gas. Halocarbon gases are virtually nontoxic and noncorrosive; however, many can replace oxygen in the air presenting a suffocation potential for those near the gas. Certain halocarbons decompose at degassing temperatures.

Sulfur hexafluoride is a similar to halocarbon 12 in that it is a nontoxic, noncorrosive gas. The time threshold limit value-TWA ("TWA" stands for "time weighted average") for sulfur hexafluoride is 1000 ppm. As with halocarbon 12, it can replace the oxygen in the air so there is a danger of suffocation. Sulfur hexafluoride does not decompose as does halocarbon 12; it is more stable at high temperatures and is often used to blanket high temperature operations. Any breakdown into sulfur and fluorine is immediately consumed by aluminum and is flushed to the surface.

DESCRIPTION OF THE PREFERRED EMBODIMENT

We have discovered and hereby disclose a process for degassing aluminum melts and purifying aluminum melts by removing aluminum oxides, particulates and gaseous impurities in a safe, reliable manner without environmental exposure to hazardous, reactive gases such as chlorine. A significant and unexpected feature of the process is that degassing and purification are carried out without substantially altering the magnesium concentration of the melt.

In accordance with the practice of the present invention, an aluminum melt is contacted with an intimate mixture of an inert gas and halogenated sulfur compound in gaseous form, preferably by bubbling the gas mixture through the melt using a lance or other conventional inlet device. Solid particles of debris entrained in the melt are brought to the surface, hydrogen is removed, and the melt effectively degassed in this manner.

The preferred halogenated sulfur compound that is used is fluorinated, preferably sulfur hexafluoride (see The Merck Index, 10th edition, monograph 8853). The halogenated sulfur compound is present in the inert gas in an amount of from about 2% to about 20% of the gas mixture and preferably is used in an amount of about 5% when mixed with nitrogen Inert gases to be used include argon, helium and, preferably, nitrogen; mixtures of two or more of these inert gases may be used. A previously prepared homogeneous mixture of the halogenated sulfur compound and inert gas, called a "premix", is preferred for reasons explained below.

In this specification the term "aluminum melt" is used to designate molten aluminum (i.e., a melt of relatively pure aluminum alloys of aluminum in their molten condition. Parts per million and percentages are expressed on a volume/volume basis unless indicated otherwise.

The aluminum-containing melt to be purified is customarily maintained at usual degassing temperatures of from about 1200 degrees Fahrenheit to about 1550 degrees Fahrenheit. Bubbling a gas through the melt inherently removes heat energy from the melt, thus a temperature decrease of up to 100 degrees Fahrenheit, but preferably less than 50 degrees Fahrenheit, is well tolerated under usual processing conditions. Aluminum and aluminum alloys are purified and unwanted impurities, particulates and metal oxides are removed together with entrained hydrogen when the $SF_6$/inert and for an appropriate time until the impurity level is reduced to a preselected level. The resultant dross which contains these impurities on the surface of the aluminum is a dry, powdery material which enhances effective removal when skimmed from the surface, reducing dross impurities in the finished casting and minimizing waste of primary aluminum. Exact operational parameters of the process will be quickly determined by empirical means by an experienced operator following the teachings presented herein. An important feature resides in the fact that the magnesium content of the melt is not substantially reduced by the process of this invention.

Included in this invention is a composition adapted for purifying aluminum and alloys of aluminum consisting essentially of an intimate mixture of up to 10% gaseous sulfur hexafluoride balance substantially an inert or non-reactive gas or gases selected from nitrogen, argon, helium or mixtures thereof.

Sulfur hexafluoride does not represent any known environmental problem and is not corrosive. A mixture of 3–10% of sulfur hexafluoride in nitrogen or argon may be packaged in a standard industrial steel cylinder. An advantage of sulfur hexafluoride over the halocarbons, notably R-12, is that a 5% $SF_6$/nitrogen mixture contains nearly twice as much gas as a 5% R-12/nitrogen mixture. This volume difference increases to four times at a 10% concentration.

The removal of hydrogen from the aluminum melt using an $SF_6$/nitrogen mixture is completely mechanical. An $SF_6$/nitrogen mixture is faster than an R-12/nitrogen mixture, and it is assumed that the change in surface tension and speed limiting effect are even greater with $SF_6$ than R-12. The smaller bubbles that are formed will also rise at a slower rate to the surface allowing for more contact time between the melt and the degassing agent.

Oxide removal using an $SF_6$/nitrogen mixture is almost totally mechanical since these mixtures have a high moistening effect on the surface providing better adhesion of oxides and particles. This combined with the smaller bubbles which expose more gas to the melt, allows $SF_6$ to be an excellent medium for removing particles and oxides.

Sulfur hexafluoride is generally non-reactive with contaminating elements in the melt; these are removed by the flushing action of the gas as it bubbles upwardly through the melt. This can be a benefit if the removal of elements such as magnesium and sodium is undesirable.

Refining using only inert gas is simple in practice. The gas is taken from cylinder bundles or from a tank where it is stored in a liquid state, and is vaporized before it enters the pipe supply system. The inert gas passes through a pressure regulator and a dosing unit. In refining, the gas is introduced into the melt through porous plugs, lances, or by rotating equipment or similar devices, depending on the choice of equipment. The amount of gas is about 35 cubic feet per ton of aluminum at a pressure of about 30–45 psig, and the flushing time is about 10–15 minutes This reduces the melt temperature about 68–136 degrees Farenheit.

Pure inert gases such as nitrogen and argon are only able to achieve a certain absolute level of hydrogen gas removal. To go lower than this predetermined value, another gas must be mixed with nitrogen or argon. Also, pure inert gases do not perform well in removing particles, oxides, and elements, thus it is necessary to mix the inert gas with a reactive gas.

When mixing inert gas with $SF_6$, it is important that the gases are properly mixed; if $SF_6$ enters the melt in the form of unmixed, concentrated volumes of the reactive gases, or plugs, it will result in very poor utilization of the gas and increased operating expense.

Homogeneous mixing is necessary because of the large differences in viscosity and density between gas, yet achieving a homogeneous mix is extremely difficult with $SF_6$. Merely running two pipes together through a flowmeter will not accomplish proper mixing. A mixing chamber or heating is required; this is then followed by analyzing the gas. Premixed cylinders filled with the appropriate $SF_6$ inert gas mixture are well suited to the process and are convenient to use. Commercially available in-situ gas blenders can also be utilized when bulk quantities of gases are required due to large quantities of aluminum or aluminum alloys to be purified. Premixed cylinders can be prepared at a central supply point using sophisticated equipment, to assure that the gas mixing process has been carried out in a manner that provides an intimate mixture of proper percentages of constituents.

The preferred method of introducing $SF_6/N_2$ to a melt is similar to that of a pure gas. A gas supply cylinder is connected to a regulator and the gas flows through a tube into a lance of graphite, graphite coated or enamel coated steel into the aluminum melt.

A COMPARATIVE EXAMPLE

In this example, not according to the present invention, a comparative experiment in accordance with prior procedures was performed in a gas-fired 600 pound furnace of 355 alloy. Chlorine at a 20% level mixed with nitrogen was bubbled through the metal through a single 0.5 inch I.D. graphite tube at a rate of 20 cfh for 20 minutes. The 20% chlorine/nitrogen mixture yielded a specific gravity of 2.67 cc/gram as measured by a Stahl vacuum tester. The spectrographic quantometer indicated a drop in the magnesium content from 0.54 to 0.38%. This correlated to normal operating procedures and required a further modification in the form of a magnesium addition to a level of 0.68 or 0.70 in order to meet specification after degassing.

ADDITIONAL EXAMPLE No. 1

A second 600 pound 355 alloy was melted and degassed using the same described procedure described in the comparative Example, except that the 20% chlorine/nitrogen gas was replaced with 5% sulfur hexafluoride in nitrogen supplied in a premixed cylinder. The data obtained are summarized in the following:

| Sample | Time minutes | Specific gravity |
|---|---|---|
| 0 | 0 | 2.53 |
| 1 | 10 | 2.64 |
| 2 | 15 | 2.64 |
| 3 | 20 | 2.65 |
| 4 | 25 | 2.65 |

Quantometer Lab Report:

| | Alloy | Si | Fe | Cu | Mn | Mg | Zn | Ti | Sn |
|---|---|---|---|---|---|---|---|---|---|
| 0 | 355 | 4.85 | 0.19 | 1.28 | 0.005 | 0.54 | 0.14 | 0.12 | 0.020 |
| 4 | 355 | 4.89 | 0.19 | 1.27 | 0.005 | 0.49 | 0.12 | 0.12 | 0.019 |
| Averages | | 4.87 | 0.19 | 1.27 | 0.005 | 0.52 | 0.13 | 0.12 | 0.020 |

Thus, similar aluminum specific gravities were reached in the same time period without any associated loss of alloy components, notably magnesium content. No further modification was necessary.

ADDITIONAL EXAMPLE No. 2

Two 300 pound gas fired furnaces containing 356 alloy aluminum were held at a temperature of 1480 degrees Fahrenheit. Ultra high purity nitrogen from a cryogenic source was bubbled through a ½" I.D. graphite fluxing tube in one furnace and a mixture of 5% sulfur hexafluoride in nitrogen was bubbled through an identical graphite fluxing tube in the second furnace. The nitrogen was bubbled through the 356 alloy at 25 cfh and the 5% sulfur hexafluoride in nitrogen mixture was bubbled at 15 cfh. Bubbling took place for 20 minutes and samples were taken at 5 minute intervals. Samples were solidified in a Stahl vacuum tester. Hydrogen levels in both furnaces were elevated to the same level. Specific gravity increased as an indirect measure of dissolved gas level. The initial specific gravity was 2.46 for both furnaces. A specific gravity of 2.65 was desired. This level was obtained under the above mentioned conditions in 10 minutes with the 5% sulfur hexafluoride in nitrogen mixture and in 15 minutes for the ultra high purity nitrogen Degassing continued for the full 20 minutes in each crucible to monitor any possible changes in alloy composition. A sample was taken from each furnace at time zero and after 20 minutes of bubbling. These were analyzed with a Jarrel Ash Spectrograph. Results are as follows:

| Time | Gas | Alloy | Mg | Zn | Si | Fe | Ti |
|---|---|---|---|---|---|---|---|
| 0 | $N_2$ | 356 | 0.34 | 0.11 | 6.69 | 0.17 | 0.16 |
| 20 | $N_2$ | 356 | 0.33 | 0.11 | 6.72 | 0.17 | 0.17 |
| 0 | $SF_6/N_2$ | 356 | 0.32 | 0.13 | 6.63 | 0.16 | 0.16 |
| 20 | $SF_6/N_2$ | 356 | 0.30 | 0.13 | 6.70 | 0.16 | 0.17 |

ADDITIONAL EXAMPLE No. 3

A 600 pound gas fired furnace was used containing aluminum alloy 535. The mixture of 5% sulfur hexafluoride in nitrogen was bubbled through a ¼" I.D. graphite lance at 20 cfh for 20 minutes to obtain the desired level of hydrogen entrainment. The desired level of hydrogen was measured at a specific gravity of 2.60. A sample was taken at time zero and later after 20 minutes of bubbling to monitor the change in composition of the alloy. Of particular concern were the magnesium concentrations which were successfully maintained within acceptable limits. Results are as follows:

| Time | Alloy | Mg | Fe | Cu | Mn | Si | Ti |
|---|---|---|---|---|---|---|---|
| 0 | 535 | 7.39 | 0.10 | 0.015 | 0.15 | 0.23 | 0.15 |
| 20 | 535 | 7.36 | 0.10 | 0.012 | 0.14 | 0.076 | 0.10 |

As can be seen, once the desired hydrogen levels have been obtained, the alloy composition of the aluminum remains intact.

Although features of the present invention have been described with a certain degree of particularity, it will be understood that the patent shall cover, by suitable expression in the appended claims, whatever features of patentable novelty that exist in the invention disclosed.

What is claimed is:

1. A process for purifying melts of aluminum alloys containing magnesium by removing solid particle impurities including aluminum oxides and gaseous impurities from the melt without substantially altering the concentration of the magnesium in the melt, comprising the step of bubbling through the melt a treating gas consisting of an inert gas containing gaseous sulfur hexafluoride in a concentration up to about 10 percent by volume sulfur hexafluoride in order to remove the gaseous impurities and the solid particle impurities from the melt to a surface thereof, thus leaving the melt in the purified condition.

2. The process of claim 1 wherein the sulfur hexafluoride comprises 2 to 10 percent by volume by the treating gas.

3. The process of claim 2 wherein the inert gas is selected from the group consisting of nitrogen, argon, and helium.

4. The process of claim 1 wherein the treating gas is nitrogen containing about 5 percent by volume of sulfur hexafluoride.

5. The process of claim 1 wherein the step of contacting the molten body with gas includes the step of bubbling the gas through the molten body.

6. The process for purifying melts of aluminum base alloys containing magnesium by removing entrained gaseous impurities and solid particulate impurities from the melt comprising the steps of bubbling through the melt a treating gas consisting of an intimate mixture of up to about 10 percent by volume sulfur hexafluoride balance an inert gas, allowing the treating gas to remove the entrained gaseous impurities and the solid particulate impurities from the melt to a surface thereof while the content of the magnesium included in the melt remains substantially the same, and separating the entrained gaseous impurities and the particulate impurities from the melt.

7. The process of claim 6 in which the solid impurities are alkali metals, alkaline earth metals or both.

8. The process of claim 7 in which the solid impurities are compounds of sodium, calcium, magnesium and lithium.

9. The process of claim 6 in which hydrogen is the gaseous impurity removed.

10. The process of claim 9 in which substantially all of the hydrogen is removed from the melt.

11. The process of claim 6 in which the sulfur hexafluoride is present in the gas in an amount of from 2 to 10%, by volume with the balance being nitrogen, argon or mixtures thereof.

* * * * *